United States Patent [19]  
Attwood

[11] 4,131,711  
[45] Dec. 26, 1978

[54] COATING PROCESS USING DISPERSIONS OF TETRAFLUOROETHYLENE POLYMERS AND POLYETHERSULPHONES AND ARTICLE

[75] Inventor: Terence E. Attwood, Kimpton, England

[73] Assignee: Imperial Chemical Industries Limited, London, England

[21] Appl. No.: 903,660

[22] Filed: May 8, 1978

Related U.S. Application Data

[63] Continuation of Ser. No. 786,938, Apr. 12, 1977, abandoned.

[30] Foreign Application Priority Data

Jan. 25, 1977 [GB] United Kingdom ............... 2954/77  
Mar. 30, 1977 [GB] United Kingdom ............. 13446/77

[51] Int. Cl.² .............................................. B32B 9/04  
[52] U.S. Cl. ............................. 428/332; 260/29.6 F; 260/900; 427/379; 427/385 C; 427/388 C; 428/411; 428/422

[58] Field of Search ............... 427/379, 388 C, 385 C; 428/411, 422; 260/29.6 F, 29.6 NR, 900

[56] References Cited

U.S. PATENT DOCUMENTS

| 2,777,783 | 1/1957  | Welch   | 427/379 |
| 3,692,569 | 9/1972  | Grot    | 428/425 |
| 3,981,945 | 9/1976  | Attwood | 428/422 |
| 3,984,604 | 10/1976 | King    | 428/411 |
| 3,992,347 | 11/1976 | Vary    | 260/900 |
| 3,993,843 | 11/1976 | Vasta   | 428/422 |

Primary Examiner—Ralph S. Kendall  
Assistant Examiner—Sadie L. Childs  
Attorney, Agent, or Firm—Cushman, Darby & Cushman

[57] ABSTRACT

Substrates are coated with a composition comprising a low molecular weight polyethersulphone containing hydroxyl and groups and having a reduced viscosity of less than 0.25 (as measured at 25° C on a solution of the polymer in dimethyl formamide containing 1 g of polymer in 100 cm³ of solution) and a fluorocarbon polymer dispersed in an aqueous medium, drying the coating and thereafter baking it in air at 420 to 450° C.

10 Claims, No Drawings

COATING PROCESS USING DISPERSIONS OF TETRAFLUOROETHYLENE POLYMERS AND POLYETHERSULPHONES AND ARTICLE

This is a continuation, of application Ser. No. 786,938 filed Apr. 12, 1977 now abandoned.

This invention relates to a coating process and in particular to a process for coating a substrate with a fluorocarbon polymer composition.

In U.S. Pat. No. 3,984,604 it is disclosed that useful coatings could be made using coating compositions comprising a fluorocarbon polymer and a thermoplastic aromatic polyethersulphone having a reduced viscosity (RV) of at least 0.3 and having at least 0.2 aromatically bound hydroxyl groups per 100 polymer repeat units and baking the coating in the presence of oxygen at a temperature in the range 330° to 450° C.

As used in this specification reduced viscosity refers to viscosity measurements made at 25° C. on a solution in dimethyl formamide containing 1 g of polymer in 100 cm$^3$ of solution.

It has been found that while satisfactory coating compositions can be made from polyethersulphones of RV at least 0.3 by dispersing a tetrafluoroethylene polymer in a solution of the polyethersulphone in a solvent therefor, e.g. dimethyl formamide, e.g. as described in U.S. Pat. No. 3 981 945, coatings made from from aqueous dispersions of such polyethersulphones, while exhibiting good adhesion to the substrate, are discontinuous. Such discontinuous coatings often have a speckled appearance in contrast to the uniform mat appearance of a continuous coating.

By utilising low molecular weight polyethersulphones (RV less than 0.25), continuous coatings exhibiting good adhesion can be obtained from aqueous coating dispersions as described in pending U.S. application Ser. No. 707,766 now patent No. 4,090,993.

However it has been found that when sintering coatings containing low RV polyethersulphones containing aromatically bound hydroxyl end groups at the sintering temperatures preferred in application Ser. No. 707,766, viz 380°-400° C., there is a tendency for minute cracks to appear in the coating. These cranks are hardly visible to the naked eye but are readily seen by the use of a microscope. Such cracked coatings are undesirable as they give a poor appearance to the coating (even though the individual cracks are barely visible) and, in extreme cases may donate inferior non-stick properties to the coated article.

It has now been found that if the coatings are sintered, in the presence of oxygen, at temperatures above 420° C., crack free coatings may be obtained.

Accordingly there is provided a process for the production of a coated article comprising applying to the article an aqueous dispersion of a tetrafluoroethylene polymer and a thermoplastic aromatic polyethersulphone in which at least 20%, preferably at least 40%, of the end groups of the polymer chain are aromatically bound hydroxyl groups and said polyethersulphone having a reduced viscosity below 0.25, drying the coating, and thereafter baking the coated article in the presence of oxygen at a temperature in the range 420 to 450° C.

The sintering temperature is preferably between 420 and 440° C.

To obtain satisfactory coatings, the RV of the polyethersulphone must be below 0.25. It can however be very low — thus polyethersulphones of RV 0.03 have given good results. We prefer to use polyethersulphones of RV between 0.03 and 0.2 and in particular between 0.08 and 0.18. Polyethersulphones of RV $\geq 0.08$ are preferred since lower RV polyethersulphones are harder to make consistently on a commercial scale.

One method of making aromatic polyethersulphones of low molecular weight and having aromatically bound hydroxyl end groups is described in British patent specification 1 286 673.

While it is preferred to use a single polyethersulphone, blends may be employed. For example a mixture of polyethersulphones of RV below 0.25 may be used; alternatively, but less preferably, a polyethersulphone of RV above 0.25 may be used in admixture with one of RV below 0.25 provided that the RV of the mixture is below 0.25. Where two or more polyethersulphones are employed they may have the same or different repeat units.

It is desirable, in the interests of coating uniformity and dispersion stability, that the polyethersulphone has a particle size of below 25 μm, as measured by a Micromerograph (Pennwalt Corporation, Pennsylvania, U.S.A.), preferably below 20 μm. This may be achieved by ball milling the polyethersulphone. Preferably the polyethersulphone has a particle size above 5 μm because it becomes more difficult and time consuming to obtain polyethersulphones of smaller particle size. The use of low molecular weight polyethersulphones (RV below 0.25) also has the advantage that aqueous dispersions thereof can more easily be made than with high molecular weight polyethersulphones. Thus, while it may take a week or more to obtain such a particle size by ball milling a polyethersulphone of RV 0.42, a polyethersulphone of RV 0.21 can be ball milled, under similar conditions, to below 25 μm in less than 24 hours.

Thermoplastic aromatic polyethersulphones comprise repeat units of the general formula $$-Ar-SO_2-$$

in which Ar is a divalent aromatic radical, which may vary from unit to unit in the polymer chain, at least some of the Ar units having the structure

in which Y is oxygen or the divalent radical obtained by removal of the hydrogen atoms from the OH groups of an aromatic diol such as hydroquinone or a 4,4'-bisphenol. Up to 50% of the —SO$_2$— groups may be replaced by —CO— groups.

Examples of such polyethersulphones have the repeating units

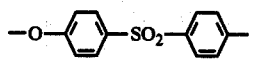

and

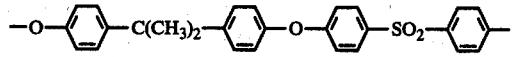

Other polymers incorporate units in the polymer chain, e.g. to give the repeat units

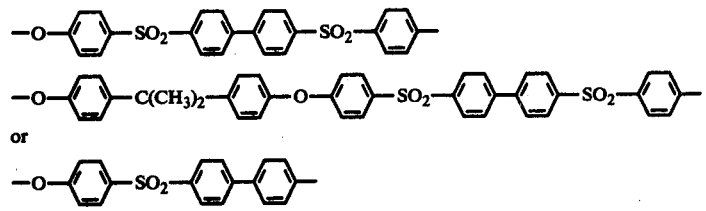

which may be present by themselves or in conjunction with repeat units such as

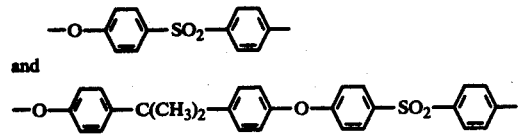

and

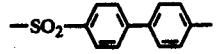

Another type of polyethersulphone incorporating

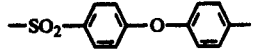

units has repeat units

together with

—SO₂—⟨ ⟩—⟨ ⟩— units,

Examples of polyethersulphones and processes for their production are described in British patent specifications 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 286 673, 1 296 383, 1 298 821 and 1 303 252, Canadian patent specification 847 963, German OLS specifications 1 938 806 and 2 433 400 and Swiss patent specification 491 981.

The polyethersulphones employed in the process of the present invention contain hydroxyl end groups. In the production of polyethersulphones by nucleophilic polycondensation of an alkali metal halophenate or a mixture of an alkali metal bisphenate and a dihalo compound (in which halophenate or dihalo compound the halogen atoms are activated by —SO₂— groups ortho or para thereto), e.g. by the processes described in British patents 1 078 234 or 1 153 035, the polymer will have alkali metal phenate and/or halogen end groups. The presence of phenate rather than halogen end groups can be ensured by using a slight excess of bisphenate when using the bisphenate/dihalo compound route or by the incorporation of a small amount of bisphenate when using the halophenate route.

The phenate end groups can be converted to hydroxy end groups by acidification or by reaction with an alkyl halide, such as t-butyl chloride that eliminates HCl rather than undergoes the substitution reaction. (Such a process for the production of polyethersulphones having —OH end groups is described in Belgian patent 819 303.)

The coating compositions preferably have tetrafluoroethylene polymer/polyethersulphone weight ratios between 9:1 and 1:9, particularly between 4:1 and 1:3.

As the proportion of tetrafluoroethylene polymer is increased, the coatings made from the dispersions become softer and more porous and less strongly adherent to the substrate. On the other hand the non-stick properties of the coatings deteriorate as the proportion of polyethersulphone increases. It is therefore particularly preferred to employ tetrafluoroethylene polymer/polyethersulphone weight ratios of between 0.75:1 and 2:1, most preferably between 0.9:1 and 1.4:1.

The coating dispersion preferably has a combined content of tetrafluoroethylene polymer and polyethersulphone of 20 to 50% by weight of the dispersion. The total solids content of the dispersion (i.e. weight of dispersed polymer plus any pigments, fillers etc) is preferably 30 to 60% by weight of the dispersion.

The aqueous coating dispersion may be made by ball milling the polyethersulphone in powder or granular form with water in the presence of an emulsifier, or by precipitation from solution.

An alternative method of making the polyethersulphone dispersion is by first making a solution of the polyethersulphone in a solvent such as methylene chloride, then forming an emulsion of that solution in water using a suitable emulsifier, e.g. sodium dioctyl sulphosuccinate, and finally evaporating off the solvent.

The tetrafluoroethylene polymer is preferably polytetrafluoroethylene or a copolymer of a tetrafluoroethylene with up to 5%, especially 0.05 to 2%, by weight of other monomers such as ethylene, vinyl chloride, hexafluoropropene or perfluoropropyl perfluorovinyl ether, preferably the tetrafluoroethylene polymer is a "lubricant grade" polytetrafluoroethylene powder. Such materials are commercially available and have relatively low molecular weights, e.g. of the order of 3000 to 250,000 [see the article by Arkles and Peterson at page 455 published in "Advances in Polymer Friction and Wear" edited by Lieng-Huang Lee, Volume 5B, of the series "Polymer Science and Technology"]. They may be made by comminution, thermal or irradiation degradation of high molecular weight polytetrafluoroethylene powders, and are characterised by an average particle size of less than 20 μm (as measured optically). Examples of commercially available lubricant grade polytetrafluoroethylene powders are 'Fluon' L169, L170 and L171 sold by Imperial Chemical Industrials Limited. For example 'Fluon' L170 is a friable polytetrafluoroethylene powder of 4 μm median particle size which can be broken down to smaller particle size when processed in various madia, e.g. by a high shear mixer.

Lubricant grade tetrafluoroethylene polymers may also be made by polymerisation of tetrafluoroethylene to a low molecular weight polymer, e.g. by polymerisation in the presence of telogens. Such telomers can be obtained by telomeration in an organic medium as described for example in United States patent specification 3 105 824 and 3 067 262, or in aqueous emulsion as described in British patent specification 1 391 246.

The coating dispersions may be made by mixing a lubricant grade polytetrafluoroethylene powder or dispersion into an aqueous polyethersulphone dispersion. Such mixing is conveniently performed using a high shear mixer.

The dispersions may also be made by dry mixing the polyethersulphone and a tetrafluoroethylene polymer powder and then forming a dispersion from the mixture.

Other ingredients, e.g. pigments, fillers, emulsifiers, viscosity modifiers, may be incorporated if desired. The incorporation of titanium dioxide as a pigment is particularly preferred as it beneficially affects the sedimentation behavior of the dispersion and, in some cases, the adhesion of the final coating. Preferred amounts of titanium dioxide are 1 to 10% by weight of the dispersion.

As disclosed in British patent specification 1 337 434 the incorporation of 0.01 to 10% by weight of diphenyl sulphone, based on the weight of the polyethersulphone, into the polyethersulphones may act as a processing aid and its incorporation into the dispersions of the present invention, e.g. prior to milling the polyethersulphone, may give coatings of better appearance.

While it is preferred to utilize lubricant grade polytetrafluoroethylene, it is also possible to utilise tetrafluoroethylene polymer aqueous dispersions. Such dispersions may be made by polymerisation of tetrafluoroethylene in an aqueous medium, normally in the presence of an emulsifying agent. Examples of such processes are described in British patent specifications 689 400 and 821 353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. A suitable stabiliser is a non-ionic surfactant such as polyoxyethylated octyl phenol containing 9 to 10 moles of ethylene oxide per mole of octyl phenol sold by Rohm and Haas Company under the trademark 'Triton' X100 or a surfactant sold by Rohm and Haas Company under the trademark 'Triton' DN65 and described by the suppliers as a modified ethoxylated straight chain alcohol.

We have found that, while satisfactory coatings can be made by using mixtures of an aqueous low molecular weight (i.e. RV below 0.25) polyethersulphone dispersion with an aqueous tetrafluoroethylene polymer dispersion, similar coatings made using a high molecular weight (i.e. RV above 0.25) polyethersulphone not only were discontinuous but also exhibited inferior adhesion.

The substrates to which the coating compositions are applied should be clean and free from grease and unless they have a fritted surface are preferably roughened, for example by abrading by grit blasting or by etching. Coatings may be applied by any of the conventional techniques, including spraying, dipping and brushing, followed by drying. The coating is then sintered by heating in the presence of oxygen, which may be in the form of air, at temperatures between 420° C. and 450° C.

During the sintering step the molecular weight of the polyethersulphone increases: it is believed that this is a result of cross-linking of the low molecular weight polyethersulphone through the hydroxyl end groups in the presence of oxygen. Hence the RV of the polyethersulphone after sintering the coating will be higher than before sintering. In some cases, the polyethersulphone may have been cross-linked to such an extent during sintering that it is no longer soluble in dimethyl formamide.

The compositions are particularly suitable for use in low friction coating applications where excellent performance is required, for example, resistance to environmental high temperatures, e.g. more than 150° C., consistent with good adhesion to substrates.

We have found that satisfactory coatings can be applied using only a single coating step. Thus it is not necessary to apply several coats to give a satisfactory product. By the use of the compositions and sintering temperatures herein described, relatively thick, e.g. 15 to 50 μm, crack free coatings may be obtained by application of a single coat.

The process of the present invention therefore provides a method of making a coated article comprising a substrate bearing a single, crack free coating of thickness at least 15 μm of a baked composition containing an aromatic polyethersulphone and a tetrafluoroethylene polymer.

The compositions may be applied as coatings to a variety of substrates, including glass, e.g. for non-stick ovenware and non-stick autoclave linings, ceramics, composite surfaces such as a metal; metals such as ferrous metals, for example cast iron, mild steel, stainless steel, and aluminum and its alloys, the substrate may be a composite surface such as metal having a reinforcing coating, such as a sprayed ceramic and/or metal powder coating. The substrate may be in the form of sheet, tube, rod, wire, fibre, or woven fabric.

The compositions are particularly suited to coating cooking utensils for example frying pans, saucepans and bakeware or for oven linings. In making cooking utensils, a blank may be coated and then formed, or an already formed utensil may be coated.

The compositions may also be used to form adherent non-stick, low friction coatings on many other articles including industrial processing equipment including autoclaves, moulds, rollers, stirrers, mixers, chutes, hoppers and heat sealing jaws, domestic articles such as iron sole plates, food mixers and ice separators and tools such as saw blades, electrical applications such as for example wire insulation.

The service temperature that can be employed will depend on the nature of the polyethersulphone. Thus while coatings made from dispersions containing polyethersulphone of repeat unit

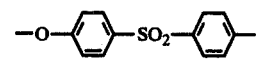

can be used for "top-of-the-stove" cookware, e.g. frying pans, saucepans, as well as ovenware, coatings made from dispersions containing polyethersulphone of repeat unit

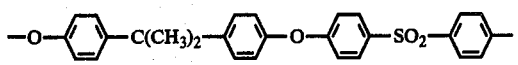

are best used in applications subjected to lower service temperatures, e.g. bakeware, egg boilers, and non-cooking untensil applications such as coatings on hair curlers and saws.

One particular non-cookware application for which the dispersions are particularly suited is the coating of glass cloth or other fabrics. For coating glass cloth, it is in some cases desirable to incorporate very fine glass beads in the coating dispersion. Such coated fabrics are of utility in the manufacture of air inflatable structures such as temporary aircraft hangers, exhibition halls, etc.

The dispersions may also be used for coating polyethersulphone film so as to provide a non-stick coating thereon.

The invention is illustrated by the following Example:

EXAMPLE

A sample (75.0 g) of a thermoplastic polyethersulphone having repeat units

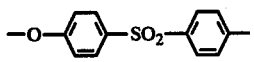

and a reduced viscosity of 0.13 in which about 50% of the end groups were aromatically bound hydroxyl groups was ball milled with an aqueous solution (181.7 g) containing 2.75% by weight of an adduct of approximately 10 moles of ethylene oxide with 1 mole of octyl phenol as a non-ionic emulsifier, in a ceramic ball mill for 18 hours.

To a portion (146.3 g) of the resultant dispersion were added: a lubricant grade polytetrafluoroethylene powder median particle diameter 3 to 4 μm, 'Fluon' L171, (42.6 g), titanium dioxide (10.6 g), a carbon black pigment (11 g) and a 33¹/3% by weight aqueous solution of an adduct of approximately 10 moles of ethylene oxide with 1 mole of octyl phenol (7.7 g).

These ingredients were mixed with the polyether-sulphone dispersion using a Silverson mixer.

The dispersion was then sprayed on to degreased aluminium plates which were then dried in air oven at 80° C. for 15 minutes to give a coating of thickness 40 μm as measured by a "Permascope" (Helmut Fischer GmbH, Maichingen, Germany). The coatings were then sintered in air at various temperatures for varying times.

The coating appearance was assessed microscopically.

| Example | Sintering Temperature (° C) | Sintering Time (min) | Coating Appearance |
|---------|------------------------------|----------------------|--------------------|
| 1 | 380 | 15 | cracked |
| 2 | 400 | 15 | cracked |
| 3 | 400 | 45 | cracked |
| 4 | 410 | 15 | cracked |
| 5 | 420 | 15 | not cracked |
| 6 | 430 | 15 | not cracked |
| 7 | 440 | 15 | not cracked |
| 8 | 450 | 15 | not cracked |
| 9 | 425 | 45 | not cracked |

I claim:

1. A process for the production of a coated article comprising applying to the article in a single coating step an aqueous dispersion of a tetrafluoroethylene polymer and a thermoplastic aromatic polyethersulphone in which at least 20% of the end groups of the polymer chain are aromatically bound hydroxyl groups and said polyethersulphone having a reduced viscosity below 0.25, as measured at 25° C. on a solution in dimethyl formamide containing 1 g of polymer in 100 cm³ of solution, drying the coating, and thereafter baking the coated article in the presence of oxygen at a temperature in the range 420 to 450° C. to achieve a single coating of thickness at least 15 μm.

2. A process according to claim 1 wherein the coated article is baked at a temperature in the range 420 to 440° C.

3. A process according to claim 1 in which the aromatic polyethersulphone has a reduced viscosity between 0.03 and 0.2.

4. A process according to claim 3 wherein the aromatic polyethersulphone has a reduced viscosity of between 0.08 and 0.18.

5. A process according to claim 1 wherein the tetrafluoroethylene polymer is a lubricant grade polytetrafluoroethylene.

6. A process according to claim 1 wherein the aromatic polyethersulphone has repeat units of the formula

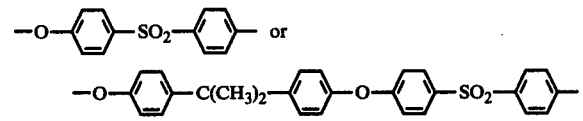

7. A process according to claim 1 wherein the tetrafluoroethylene polymer/polyethersulphone weight ratio is between 0.75:1 and 2:1.

8. A process according to claim 7 wherein the tetrafluoroethylene polymer/polyethersulphone weight ratio is between 0.9:1 and 1.4:1.

9. A process according to claim 1 wherein at least 40% of the end groups of the polymer chain are aromatically bound hydroxyl groups.

10. A coated article made by the method of claim 1.